Figure 1:
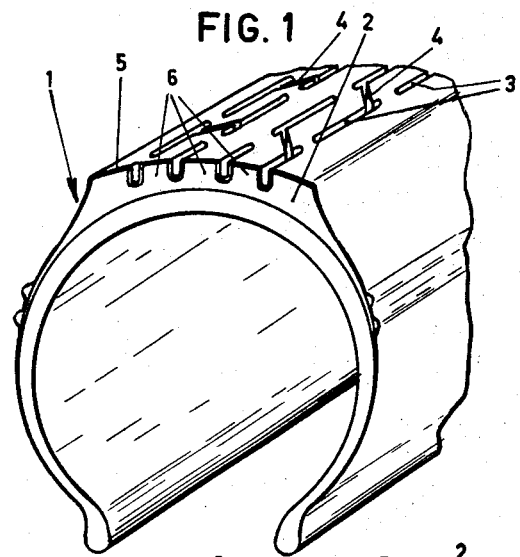

United States Patent [19]

Bins

[11] 3,833,040

[45] Sept. 3, 1974

[54] OUTER COVER OR TYRE

[75] Inventor: Cornelis G. Bins, Heelsum, Netherlands

[73] Assignee: N.V. Rubberfabrick Vredestein, The Hague, Netherlands

[22] Filed: June 7, 1972

[21] Appl. No.: 260,498

[30] Foreign Application Priority Data
June 21, 1971 Netherlands ............... 7108520

[52] U.S. Cl. ....................... 152/330, 152/209 R
[51] Int. Cl. ........................................ B60c 11/00
[58] Field of Search ........... 152/330 A, 209 R, 361, 152/210

[56] References Cited
UNITED STATES PATENTS

| | | | |
|---|---|---|---|
| 3,062,696 | 11/1962 | Riehl | 152/209 R |
| 3,516,467 | 6/1970 | Sims | 152/330 A |
| 3,578,055 | 5/1971 | French et al. | 152/210 |
| 3,592,252 | 7/1971 | Olagnier | 152/209 R |
| 3,653,422 | 4/1972 | French | 152/330 A |

Primary Examiner—M. Henson Wood, Jr.
Assistant Examiner—Richard A. Bertsch
Attorney, Agent, or Firm—Karl W. Flocks

[57] ABSTRACT

An outer cover or tyre for bicycles, autocycles, motor-vehicles and other vehicles, of which the tread is profiled and presents grooves and elevations, said cover or tyre being recovered with a filing layer of a colour which deviates from the colour of the underlying material of the cover or tyre, the grooves or parts thereof presenting a different depth preferably arranged according to a predetermined pattern.

4 Claims, 8 Drawing Figures

PATENTED SEP 3 1974    3,833,040

OUTER COVER OR TYRE

This invention relates to an outer cover or tyre for vehicles, which is particularly suitable for bicycles, autocycles and similar vehicles and aims at making provisions to warn the user that at a given moment the studs or profiles of the cover or tyre have worn off to such an extent as to render further driving inadvisable.

In this connection the fact is often overlooked that with moist weather in heavy city traffic also cycle covers, like automobile tyres, should be in a satisfactory condition. In many instances the cover or tyre is used up to the moment at which it is entirely smooth and even until the canvas becomes visible, which in view of the risk of slipping should not be considered to be warranted for cyclist and even more for autocyclists.

It has been attempted to meet this difficulty by selecting for the rubber of the tread a different colour than the colour of the underlying layer.

It is also known to provide a strip of rubber of a different colour between the tread and the canvas layer. The drawback of both solutions is that one must drive quite some time after the attrition of the studs to detect the difference in colour.

The invention aims at meeting this difficulty which with the outer cover or tyre according to the invention is accomplished in that at least the tread of the cover or tyre is recovered with a filing layer of a colour which deviates from the colour of the underlying material of the cover or tyre, the thin and preferably filing layer following the profile of the tread, in this case the studs. It is preferred to apply said thin layer prior to the vulcanization of the cover or tyre.

If after the attrition of the cover or tyre there is still something left of the studs, as a result of the crushing thereof and the wear the thin layer in the grooves and therefore the pattern of the profile of the tread will disappear which presents an indication for the driver that the cover or tyre has to be replaced. Thus driving with a too smooth cover or tyre is avoided.

The grooves in the profile of the cover or tyre may present differences in depth preferably provided according to a predetermined pattern. In this way meanwhile the change occurring in the pattern can be a warning for those who do not wish to await the moment of the minimum height of the studs before replacing the cover or tyre.

This may be enhanced by a further feature of the invention in that the pattern of the profiles with the differences in depth of the grooves is composed such that after a certain attrition of the tread letter signs and/or warning signs develop.

According to a preferred embodiment of the outer cover or tyre the filing layer on the heads of the studs or some other profile may be ground off. The result is that the cover or tyre which is ready for sale has studs of a colour different from the colour of the recesses between the studs so that the differences occurrring after driving may already be pointed out to the future driver when purchasing.

The material of the thin layer provided on the tread or in the recesses respectively may have a lower wear resistance than the material of the tread, so that it offers less resistance to attrition than the material of the tread.

It is still to be noted that the filing layer may also be replaced by a somewhat thicker layer but for reasons of economy this is not to be preferred.

Finally it may be of importance, in order to prevent the edges of the filing layer from being damaged during driving, to extend said layer completely or partly over the cheeks of the cover or tyre.

Naturally the invention can also be applied for automobile tyres.

The invention will be further explained below with reference to the accompanying drawings showing by way of example some embodiments of the cover or tyre according to the invention.

THE DRAWINGS SHOW IN

Figure 2:
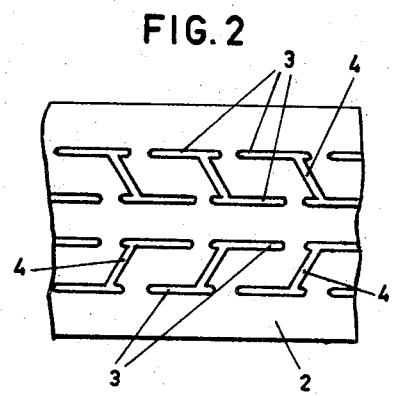
Figure 3:
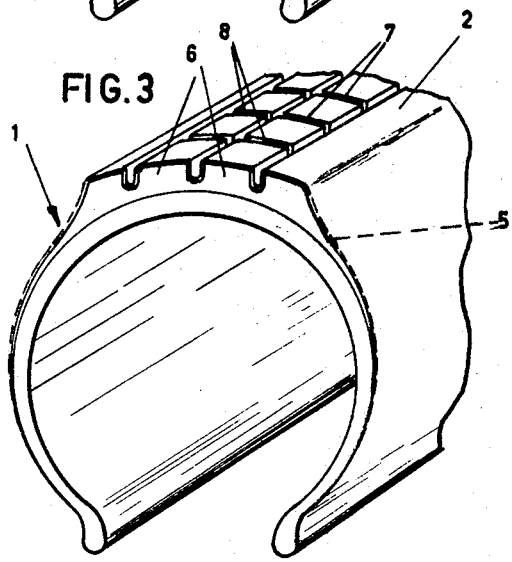
Figure 4:
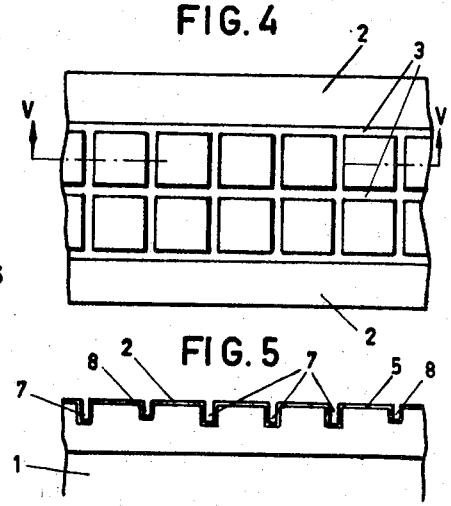
Figure 5:
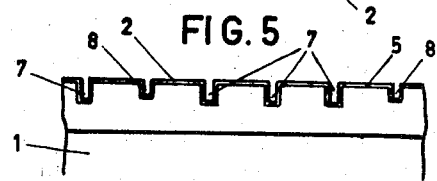
Figure 6:
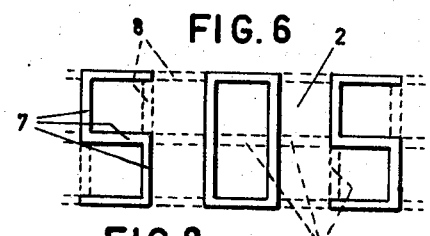
Figures 7, 8:
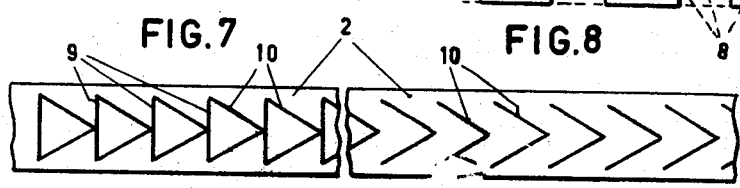

FIG. 1 in perspective part of a cover or tyre provided with a profile comprising a plurality of grooves of equal depth in the tread of the cover or tyre;

FIG. 2 a top plan view of the tread of the cover or tyre according to FIG. 1;

FIG. 3 in perspective part of a cover or tyre the tread of which comprises grooves of different depth;

FIG. 4 a top plan view of the tread of the cover or tyre according to FIG. 3;

FIG. 5 a section according to the line V—V of FIG. 4;

FIG. 6 a top plan view of the tread according to FIG. 4 after it has worn off to such an extent that the letters become visible; and FIGS. 7 and 8 a top plan view of another type of cover or tyre having grooves of different depth, in the condition in which the tread is still serviceable and in the condition in which it has worn off to such an extent that the letters are visible respectively.

The outer cover or tyre 1 shown in FIGS. 1 and 2, which may be composed in any manner known per se, comprises a tread 2 provided with a plurality of rows of short grooves 3 arranged in the circumference of the cover or tyre, said grooves being interconnected two and two by connecting grooves 4. On the tread 2 and in the grooves 3 and 4 there is a thin layer of material 5 of a different colour than the material of the underlying tread. When this cover or tyre is used this thin layer of material 5 first wears off from the surface of the profile or studs 6 of the tread so that consequently the grooves 3 and 4 assume a colour different from that of the profile or studs 6. Said thin layer 5 can also be ground off directly from the profile or studs 6 before the cover or tyre is put on the market.

When the cover or tyre is in use the profile 6 wears off regularly until its height has become so small that in use the profile is crushed in to such an extent that the thin layer 5 in the grooves which then are only shallow comes into contact with the road surface and is ground off so that in these places the tread assumes the colour of the material of the tread portion of the cover or tyre. As soon as this is the case one knows that the tread portion has worn off to such an extent that the cover or tyre should be replaced by a new one.

The cover or tyre 1 according to FIGS. 3–6 differs from the one according to FIGS. 1 and 2 in that the tread portion 2 thereof comprises groove parts 7 and 8 of which the groove parts 7 shown in full lines are deeper than the groove parts 8 shown in dotted lines 8 (see FIG. 6). When the profile of the tread portion has worn off to such an extent that the filing layer in the shallow grooves disappears, then at that place or these places where the deep grooves are the letters SOS appear from which it becomes evident that the cover or tyre should be replaced by a new one.

The embodiment of the tread portion 2 shown in FIGS. 7 and 8 differs from the one according to FIGS. 3–6 in that the tread portion 2 comprises shallow transverse grooves 9 and deeper V-shaped grooves 10, said transverse grooves connecting the legs of the V. When the filing layer in the shallow grooves 9 has worn off the letter V (first letter of the manufacturer's name) becomes visible on the tread.

In order to prevent the edges of the filing layer from being damaged during driving one may use for the filing layer such dimensions that it extends over at least part of the cheeks of the cover or tyre.

It is obvious that the invention is not restricted to the embodiments described above and shown in the drawings but that these may be modified in many ways without departing from the invention.

We claim:

1. A tire for bicycles, autocycles, automobiles and the like vehicles having a tread provided with a traction pattern formed by grooves in said tread, said grooves having at least wall portions thereof covered with a thin layer of a material having a color which deviates from the color of the material of the tire, the grooves formed by the pattern of the tire presenting differences in depth and being arranged according to a predetermined pattern in such a way that after a certain wear of the tread warning signs in the shape of letters, figures and the like warning signs appear, said warning signs indicating a degree of tread wear.

2. A tire for bicycles, autocycles, automobiles and the like vehicles according to claim 1, characterized in that the material of thin layer provided at least on the wall portions of the grooves in the tread has a lower wear resistance than the material of the tread.

3. A tire for bicycles, autocycles, automobiles and the like vehicles having a tread provided with a traction pattern comprising grooves formed therein, said grooves being characterized in that at least wall portions thereof are covered with a thin layer of a color which deviates from the color of the underlying material of the tire, said thin layer following the pattern of the tread and extending over at least part of the side walls of the tire.

4. A tire for bicycles, autocycles, automobiles and the like vehicles having a tread provided with a traction pattern, said pattern being formed by at least three circumferential grooves, said circumferential grooves being connected with one another by cross grooves, at least the walls of said grooves being covered with a thin layer of material having a color which deviates from the color of the material of the tread, the grooves of said pattern presenting differences in depth, the differences in depth of said grooves being arranged according to a predetermined pattern in such a way that after a certain wear of the tread warning signs in the shape of letters, figures and the like appear on the tread indicating a degree of wear of the tread.

* * * * *